Figures 1, 2, 3:
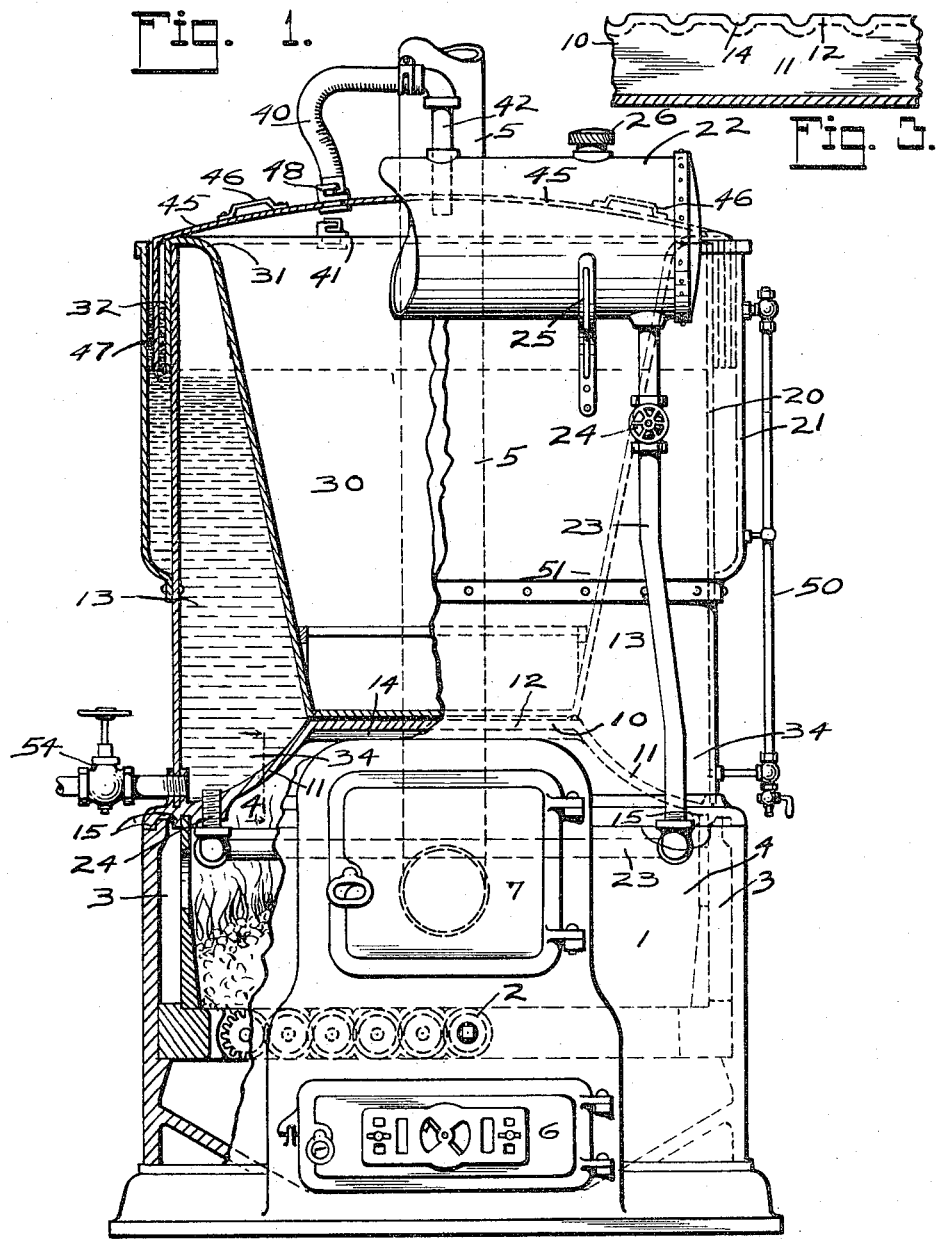

C. F. HUFFMAN.
AGRICULTURAL COOKER.
APPLICATION FILED SEPT. 16, 1914.

1,148,684.

Patented Aug. 3, 1915.

WITNESSES:
C. H. Bills.
F. E. Aul.

INVENTOR.
Clark F. Huffman.
by
Owen, Owen & Crampton.

UNITED STATES PATENT OFFICE.

CLARK F. HUFFMAN, OF GRAND RAPIDS, OHIO.

AGRICULTURAL COOKER.

1,148,684.   Specification of Letters Patent.   Patented Aug. 3, 1915.

Application filed September 16, 1914. Serial No. 862,007.

*To all whom it may concern:*

Be it known that I, CLARK F. HUFFMAN, a citizen of the United States, and a resident of Grand Rapids, in the county of Wood and State of Ohio, have invented a certain new and useful Agricultural Cooker; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to agricultural cookers.

It has for its object to provide an efficient cooking apparatus which will heat quickly, which may be heated by any form of fuel, which may be readily manipulated and altered according to the character of the work which it is required to perform, and which will retain the heat and prevent the escape of steam.

The invention consists in providing a jacketed cooker having a crown plate located in juxtaposition to the bottom of the cooking pot or kettle which may be covered to any desired depth with water.

It also consists in providing a means for heating the water in advance to its insertion in the cooking apparatus.

It also consists in providing a means for condensing the steam or vapor that may arise in the process of cooking or drying.

It also consists in other features which are described in the specification, illustrated in the drawing and covered by the claims together with the modifications thereof.

The invention may be contained in many forms of constructions usable for different purposes, all of which come within the purview of my claims hereinafter appended. To show the practicability of my invention I have selected one of such constructions as an example and shall describe it hereinafter. The construction selected is illustrated in the accompanying drawings.

Figure 1 of the drawing illustrates a side, broken and sectional view of the agricultural cooker. Fig. 2 illustrates a tray used in drying agricultural products. Fig. 3 illustrates a sectional side view of the crown plate used in the cooking apparatus illustrated in Fig. 1.

1 is the heater of the cooking apparatus having the usual form of grate 2 and a flue 3 which extends around the fire chamber 4 and connects with the pipe or chimney 5. The heater is provided with the usual damper 6 and door 7.

The top of the heater consists of the crown plate 10 having slanting or segmental cylindrical walls 11 which concentrate the heat upon the central portion of the crown plate 10 and also form troughs 34 in the cooking chamber 13 of the cooking apparatus. The central portion of the crown plate 12 is provided with cross channels 14 which extend across the top of the crown plate. The channels 14 form passageways beneath the bottom of the pot or pan heated by the cooker through which the water may pass from one side to the other of the crown plate. They prevent explosive action of the steam that may be formed below the bottom of the pot or pan and distribute the heat beneath the bottom of the pot or pan. By this arrangement the bottom of the pan may be placed on the crown plate directly heated thereby, the water in the channels operating to regulate the temperature to a great extent, or make it uniform. When the level of the water is raised to just above the bottoms of the channels, that is, to near the top of the crown plate, it is heated in the channels under the bottom of the pot or pan and is under these conditions particularly efficient in regulating the heat of the pan which is thus transmitted largely through the bottom of the pan. Also, if steam is formed it will extend under the pan and pass out from beneath the pan. The outer edge of the crown plate is provided with suitable locking lugs or ridges 15 which set into channels or over the edges of the walls forming the draft flue 3 as in the manner well known in the art.

A jacketed boiler, having a cylindrical or rectangular wall 20 is supported on the top of the heater 1. The wall is suitably connected and hermetically sealed to the outer upper edge of the heater 1. A second wall 21 is supported on the upper end of the wall 20. The walls are spaced apart so that the space formed between them may be filled with water to any desired depth. The interior of the heating chamber 13 contained within the inner surrounding wall 20 is connected with a reservoir 22, through a pipe 23 having a controlling valve 24, to a reservoir 22 supported on brackets 25. The pipe extends down from the reservoir 22 and through the front wall of the heater and around the upper edge of the fire chamber and up through a connector 24, to one corner of the cooking chamber 13. In this way the water which is allowed to pass through the pipe 23 is heated in advance to its entrance into the cooking chamber.

A pot 30 having a wall flaring at its upper portion 31 and having a downwardly extending flange 32, may be located on the crown plate 10. It is seated on the crown plate, the bottom being placed in contact therewith. The flange 32 sets loosely between the two walls. Material of any character may be inserted in the pot 30 and water may be allowed to flow into the cooking chamber 13 by opening the valve 24. The level of the water may be allowed to rise to any height such as to the top of the crown plate 12 when it will pass between the bottom of the pot 30 and the top of the crown plate through the channels or grooves or corrugations 14. A flexible pipe 40 is connected to the pipe coupler 41. The pipe coupler 41 is located in the horizontally flaring portion 31 of the pot 30. The pipe 40 is connected with the pipe 42 which extends into the boiler or reservoir 22. Any steam collecting between the pot and the wall 20 will pass through the pipe 40 and be condensed in the reservoir 22.

When it is desired to close the pot 30 a cover 45 having the handles 46 and the flange 47 may be placed over the flange 32 of the pot 30. The two flanges extend into the water inserted between the walls 20 and 21 which seals the cooker. When the cover 45 is to be placed upon the top of the pot 30, the pipe 40 is uncoupled from the coupler 41 and coupled to the coupler 48 located on the cover 45 so that steam and vapor formed in the cooking chamber 13, then passes out through the opening in the coupler 41, and together with the vapors which are formed in the pot 30, passes off through the pipe 40 to the reservoir 22.

In the drying process the level of the water is raised to about the top of the crown plate or slightly above and the material, or the agricultural products to be dried are placed in the pot 30. The material or the products may be placed upon the latticed trays 55 which may be placed on top of each other in the pot 30.

The cover 45 may be provided with a flange 47 which extends into the chamber formed between the walls 20 and 21.

The cooker may be provided with a suitable gage such as a float or the usual glass gage 50 for indicating the level of the water in the cooking chamber. It may also be provided with the usual flush or gate valve 54.

The construction selected and described may be greatly varied in the arrangement and manufacture of its parts and in the substitution of elements having equivalent functions and such modifications may be used for many varied purposes and still contain the invention.

Having thus described my invention, what I claim as new, and desire to secure by Letters Patent, is,—

1. The combination of a cooker having a heating chamber and a cooking chamber, a crown plate separating the chambers, a reservoir for containing water, a pipe communicating with the reservoir and extending around the outer edge and within the heating chamber and communicating with the cooking chamber, a pot located in proximity to the crown plate and a pipe connecting the pot and the cooking chamber with the reservoir for collecting and condensing steam and vapors formed in the cooking chamber.

2. The combination of a cooker having a heating chamber and a cooking chamber, a crown plate for separating the chambers, a jacket surrounding the upper edge of the cooking chamber and removably located from the heating chamber for containing water, a pot located within the cooking chamber and having a depending flange extending into and sealed by the water in the jacket, and a reservoir for containing water communicating with the bottom of the cooking chamber, a cover having a flange inclosing the flange of the pot and located in the jacket, a pipe for connecting the cooking chamber and pot with the reservoir for condensing the steam and vapors formed in the pot and the cooking chamber.

3. The combination of a cooker having a heating chamber and a cooking chamber, a crown plate having centrally located grooves extending across the top of the crown plate and a pot located on the crown plate.

4. The combination of a cooker having a heating chamber and a cooking chamber, a crown plate separating the chambers and having grooves extending across the crown plate, a pot supported on the crown plate, a jacket surrounding the upper edge of the cooking chamber for containing water, the pot having a flange extending into the jacket and adapted to extend below the surface of the water in the jacket.

In testimony whereof, I have hereunto signed my name to this specification in the presence of two subscribing witnesses.

CLARK F. HUFFMAN.

Witnesses:
F. E. AUL,
E. E. THOMAS.